United States Patent
Guercia et al.

(10) Patent No.: US 7,695,066 B2
(45) Date of Patent: Apr. 13, 2010

(54) DISPOSABLE SEAT COVER DEVICE

(76) Inventors: Renee D. Guercia, 600 Pine Hollow Rd., 20-2B, East Norwich, NY (US) 11732; Suzette A. Guercia, 600 Pine Hollow Rd., 20-2B, East Norwich, NY (US) 11732

( * ) Notice: Subject to any disclaimer, the term of this patent is extended or adjusted under 35 U.S.C. 154(b) by 0 days.

(21) Appl. No.: 11/977,016

(22) Filed: Oct. 23, 2007

(65) Prior Publication Data

US 2008/0191529 A1 Aug. 14, 2008

Related U.S. Application Data

(63) Continuation-in-part of application No. 11/704,011, filed on Feb. 8, 2007.

(51) Int. Cl.
*A47C 31/11* (2006.01)
(52) U.S. Cl. .............. 297/228.11; 297/219.1; 297/219.12; 297/224; 297/225; 297/228.1; 297/229
(58) Field of Classification Search ............ 297/219.12, 297/256.17, 224, 225, 228, 228.11, 229, 297/219.1, 228.1, 227
See application file for complete search history.

(56) References Cited

U.S. PATENT DOCUMENTS

| 4,056,281 | A |   | 11/1977 | Byrnes .................. 297/220 |
|---|---|---|---|---|
| 4,396,227 | A | * | 8/1983 | Neilson ............... 297/228.11 |
| 4,609,580 | A | * | 9/1986 | Rockett et al. ........... 428/198 |
| 4,669,779 | A | * | 6/1987 | Kaganas et al. ......... 297/224 X |
| 4,676,549 | A | * | 6/1987 | English ................... 297/224 |
| 4,693,511 | A | * | 9/1987 | Seltzer et al. ........... 297/228.1 |
| 4,718,721 | A | * | 1/1988 | Pompa ................ 297/228.11 |
| 4,766,617 | A |   | 8/1988 | Thygesen et al. ........... 4/245.4 |
| 4,840,841 | A |   | 6/1989 | Madsen .................... 428/136 |
| 4,883,701 | A | * | 11/1989 | Rankin et al. .......... 297/229 X |
| 4,885,200 | A | * | 12/1989 | Perdelwitz et al. .. 297/219.12 X |
| 4,891,454 | A | * | 1/1990 | Perdelwitz et al. .. 297/219.12 X |
| 4,892,769 | A | * | 1/1990 | Perdelwitz et al. .. 297/219.12 X |
| 4,958,886 | A | * | 9/1990 | Barattini et al. ........... 297/229 |
| 4,975,990 | A |   | 12/1990 | Chan ...................... 4/245.1 |
| 4,979,237 | A |   | 12/1990 | Hazar et al. ................ 4/244.1 |
| 5,005,901 | A | * | 4/1991 | Hinde ..................... 297/229 |
| 5,023,125 | A | * | 6/1991 | Gray .................. 297/228.1 X |

(Continued)

FOREIGN PATENT DOCUMENTS

WO WO 03/086846 A1 * 10/2003

*Primary Examiner*—Rodney B White
(74) *Attorney, Agent, or Firm*—Ernest D. Buff & Associates, LLC; Ernest D. Buff; Margaret A. LaCroix

(57) ABSTRACT

A single-use disposable sanitary cover temporarily houses a portion of a seat and mitigates virus and germ contact on a person's body. The disposable sanitary cover includes a flexible elongated sleeve having an outer shell, an interior cavity and an elongated slit forming a rim equipped with a stabilizing means integrally associated therewith. The stabilizing means is preferably an elastic band or segment that engages with the rear of the back support and seat areas of the chair to secure the elongated sleeve in place. The seat area and/or back support area of the chair is received through the elongated slit and is housed within the elongated sleeve in order to mitigate contact between the chair surface and a person's body.

18 Claims, 8 Drawing Sheets

U.S. PATENT DOCUMENTS

| | | | |
|---|---|---|---|
| 5,028,472 A * | 7/1991 | Gray | 297/228.1 X |
| 5,107,549 A | 4/1992 | Pitts et al. | 4/245.2 |
| 5,150,947 A * | 9/1992 | Croshaw | 297/229 |
| 5,234,252 A * | 8/1993 | Wallach | 297/220 X |
| 5,265,933 A * | 11/1993 | Croshaw | 297/228.1 |
| 5,551,096 A | 9/1996 | Gardner | 4/245.4 |
| 5,833,309 A * | 11/1998 | Schmitz | 297/219.12 X |
| 5,845,967 A * | 12/1998 | Kane et al. | 297/225 X |
| 5,897,164 A * | 4/1999 | Kagan et al. | 297/219.12 |
| 5,967,606 A * | 10/1999 | Bergh et al. | 297/219.12 X |
| 6,067,777 A * | 5/2000 | Stoll | 297/219.1 X |
| 6,129,418 A * | 10/2000 | Bergh et al. | 297/219.12 X |
| 6,131,995 A * | 10/2000 | Smith | 297/229 |
| 6,206,471 B1 * | 3/2001 | McGowan | 297/219.12 X |
| 6,394,543 B1 * | 5/2002 | Dunne et al. | 297/219.12 |
| 6,428,098 B1 * | 8/2002 | Allbaugh | 297/219.12 |
| 6,447,059 B1 * | 9/2002 | Jackson et al. | 297/224 X |
| 6,491,996 B2 * | 12/2002 | Digangi | 297/229 X |
| 6,517,155 B1 * | 2/2003 | Landine | 297/256.17 |
| 6,547,325 B2 * | 4/2003 | Drost et al. | 297/219.12 X |
| 6,655,734 B2 * | 12/2003 | Hunter et al. | 297/224 X |
| 6,786,546 B2 * | 9/2004 | McConnell et al. | 297/219.12 |
| 6,929,326 B2 * | 8/2005 | Cohen-Fyffe | 297/219.12 |
| 6,959,963 B2 | 11/2005 | Hunter et al. | 297/219.12 |
| 7,204,551 B2 * | 4/2007 | Kahan | 297/225 X |
| 7,341,011 B2 * | 3/2008 | Pines et al. | 297/219.12 X |
| 7,367,621 B1 * | 5/2008 | Han-Dressor et al. | 297/219.12 X |
| 7,410,213 B1 * | 8/2008 | Ferrari-Cicero et al. | 297/219.12 |
| 7,416,250 B1 * | 8/2008 | DiFilippo | 297/219.1 X |
| 7,537,284 B1 * | 5/2009 | Antorcha | 297/219.12 |
| 2001/0048235 A1 * | 12/2001 | Hartranft | 297/219.12 |
| 2003/0218367 A1 * | 11/2003 | Parker et al. | 297/229 |
| 2004/0207239 A1 * | 10/2004 | King | 297/219.12 |
| 2004/0262964 A1 * | 12/2004 | Ryan | 297/219.1 |
| 2005/0057080 A1 | 3/2005 | Collins | 297/219.12 |
| 2005/0110315 A1 * | 5/2005 | Littlehorn et al. | 297/219.12 |
| 2006/0082196 A1 * | 4/2006 | McConnell et al. | 297/219.12 X |
| 2007/0040426 A1 * | 2/2007 | Kenny | 297/229 |
| 2007/0052277 A1 * | 3/2007 | Smulders et al. | 297/229 X |
| 2008/0001451 A1 * | 1/2008 | Olson | 297/219.12 |
| 2008/0079297 A1 * | 4/2008 | Braxton Perry | 297/219.12 |
| 2008/0084099 A1 * | 4/2008 | Palgon | 297/219.12 |
| 2008/0150335 A1 * | 6/2008 | Pines et al. | 297/219.12 |

* cited by examiner

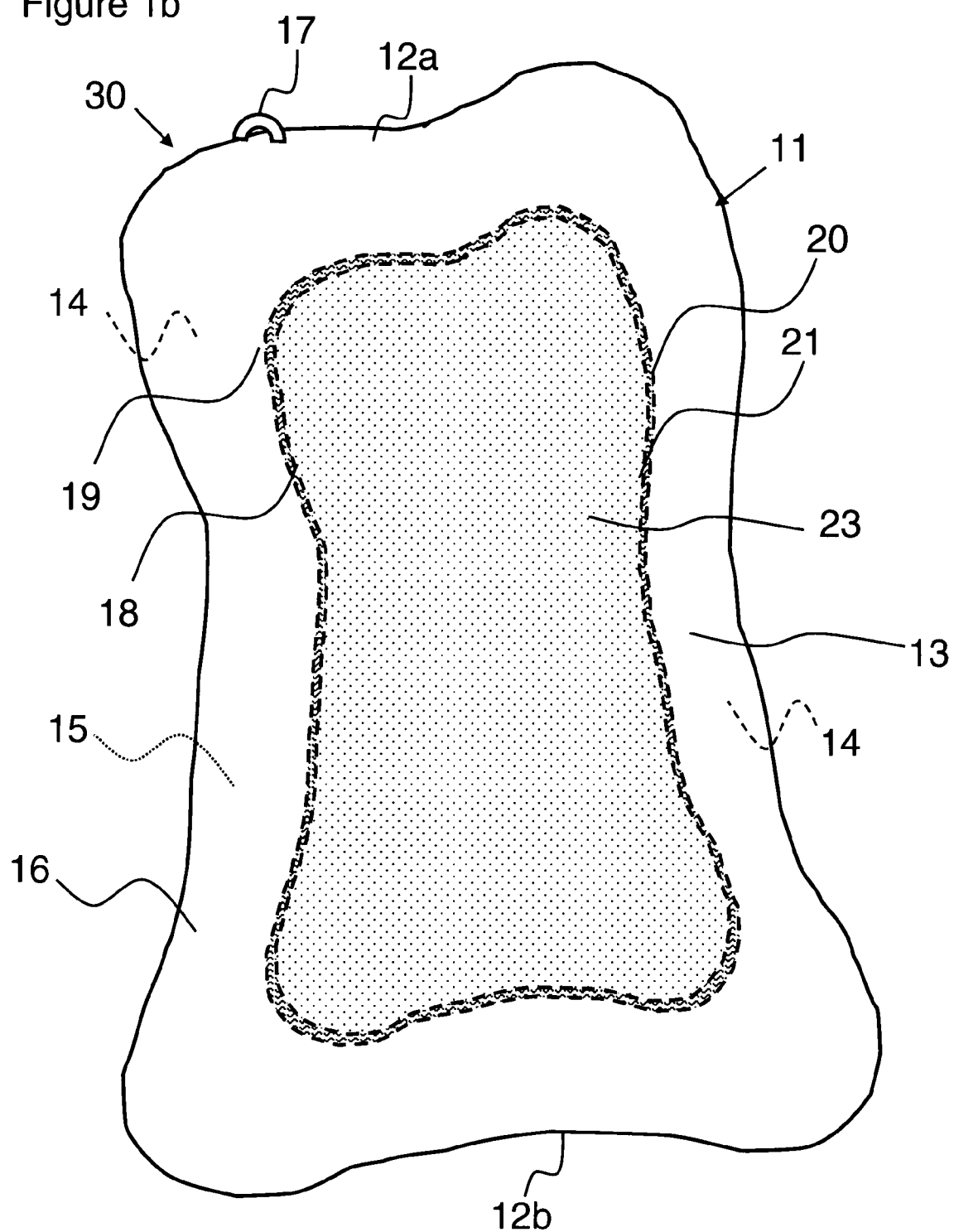

DISPOSABLE SEAT COVER DEVICE

CROSS REFERENCE TO RELATED APPLICATIONS

This application is a continuation-in-part of co-pending U.S. patent application Ser. No. 11/704,011, filed Feb. 8, 2007, the entire disclosure of which is incorporated by reference herein as if being set forth in its entirety.

BACKGROUND OF THE INVENTION

1. Field of the Invention

The present invention relates to a disposable seat cover device; and more particularly, to a disposable sanitary cover for a seat or chair that is adapted for single-use and is slipped over the seat and secured thereto for protecting the seat while also preventing germs on the seat surface from contacting a person's body.

2. Description of the Prior Art

The spread of viruses and germs via the contact interface between a person's body and public seats, such as those in movie theaters, trains, airplanes or the like, concern many consumers. Movie theatre seats have been found to host a plethora of germs, since a single seat cart can be utilized by dozens of individuals each day. Just sitting on a contaminated seat immediately places a person in danger of contacting harmful, unhealthy germs. Moreover, seats repeatedly utilized may contain spilled liquids or food on their surfaces. These spilled substances oftentimes come into contact with a person that later sits on the seat, leading to irritation, embarrassment and stained clothing. Attempts have been made to provide measures to avoid or mitigate contact with these germs and contaminants. However, many of these devices fail to provide a cover that is readily slipped over the entire seating and is equipped with stability means that prevent the covering from moving lengthwise and circumferentially when the user shifts or gets up from the seat.

Various seat covers have been provided, however many of these coverings are not designed for disposal after a single use; but are, instead, designed for permanent use in homes or the like and require installation. Even where disposable sanitary seat covers have been provided, these covers are generally constructed and appointed for use on children's seats and high chairs. For example, see U.S. Pat. No. 6,959,963 to Hunter, et al. which discloses a disposable sanitary seat cover for children placed in high chairs and shopping carts having a sheet with a base seat cover area appointed with passages for providing openings for legs of a child and for safety belts. Similarly, see U.S. Patent App. Pub. No. 20050057080 to Collins. Also see, U.S. Pat. No. 4,840,841 to Madsen which teaches a disposable one-piece seat liner formed from a uniform layer of absorbent cellulose fibers bonded to a flexible moisture repellant backing sheet designed with an upper section sized to cover a seat back and a lower section sized to cover a seat bottom secured via folding the liner, and provided with a plurality of slots for securing the cover to car seats, strollers, carriers, highchairs and the like. These seat covers are constructed to be utilized in high chairs, strollers, shopping carts and the like, and are not constructed for use in covering public seats in a substantially encasing manner. Accordingly, these coverings do not provide a simple cover that is readily placed to substantially encompass a public seat in a manner that shields a user against infectious germs.

Disposable seat coverings generally disclosed in the art involve disposable seat coverings for toilet seats for hygienically protecting individuals from contacting public toilet seat surfaces. For example, see U.S. Pat. No. 5,107,549 to Pitts, et al. which discloses a disposable toilet seat cover designed to fit over and around horseshoe or U-shaped toilet seats and for immediate disposal in the toilet after use thereof. Similarly, see U.S. Pat. Nos. 4,766,617 to Thygesen, et al.; 4,979,237 to Hazar, et al.; 4,975,990 to Chan; and 5,551,096 to Gardner for more examples of toilet covering constructs. These coverings are constructed to fit over the toilet seating while providing an opening centrally therein for access to the commode bowl and are not constructed nor appointed to be utilized on seats, such as movie theatre seats.

Other disposable seat covering devices have been provided that merely cover a portion of a seat. For example, U.S. Pat. No. 4,056,281 to Byrnes discloses a disposable back seat headrest cover adapted to be removably secured to an attachment strip mounted upon and affixed to the back seat fabric in the area where normally a person sitting in the seat would place his head at rest. Unfortunately, these coverings do not cover the entire surface of the seat to which the person sitting thereupon is exposed. Therefore, these types of disposable coverings do not provide an optimally sanitary seat covering.

Notwithstanding the efforts of prior art workers to construct a disposable seat cover device for use on public seats, such as theatre seats, to prevent or mitigate germ contact, there remains a need in the art for a single-use disposable sanitary seat cover adapted to temporarily house a seat. There is a need in the art for a disposable seat covering composed of a disposable material, such as paper netting, and having a stabilizing means interstitially constructed therein for securing the covering onto the seat. Further, there is a need in the art for a disposable sanitary seat covering that is simply slipped over and secured to the seat, by way of the stabilizing means, in an effortless manner, and is removed and discarded after a single-use.

SUMMARY OF THE INVENTION

The present invention provides a disposable sanitary cover for seats, as well as a method for use thereof. The disposable sanitary cover for seats is particularly well suited to cover movie theatre seats, as well as seats used for mass public transportation, such as seats in trains, airplanes, and/or busses. In essence, the disposable sanitary cover for seats provides a covering constructed as an elongated sleeve construction having an interior cavity and an external surface. The sleeve has a slit therein for readily slipping the cover over a portion of a seat so that the seat enters the interior cavity therein and the external surface is adapted to come into contact with a person's body. The elongated sleeve is further provided with stabilizing means to secure the elongated sleeve to the seat as well as mitigate movement of the elongated sleeve on the seat while the person sitting thereon shifts around. Prevention of movement of the elongated sleeve during use averts unwanted exposure to contaminated portions of the seat and thwarts damage to the cover during use.

The disposable sanitary cover for temporarily housing a portion of a seat and mitigating virus and germ contact on a person's body includes an elongated sleeve. The elongated sleeve comprises a first end, second end, a central section, and side walls constructed to form an interior cavity and an external shell. It is composed of a flexible material. An elongated slit in the sleeve forms a rim traversing along the side walls and being appointed for accessing the interior cavity within the elongated sleeve. The disposable sanitary cover additionally includes a stabilizing means integrally constructed within the elongated sleeve. A stabilizing means is provided to secure the elongated sleeve onto the seat and mitigate movement when being used. The portion of the seat is received through the elongated slit and is housed within the interior cavity of the elongated sleeve in order to mitigate virus and germ contact between the seat and the person's body. Preferably, the disposable sanitary cover includes a tab member for removing the disposable sanitary cover from the seat.

The method of using a disposable sanitary cover for temporarily housing a portion of a seat and mitigating virus and germ contact on a person's body includes the steps of removing an elongated sleeve from a dispensing device. The elongated sleeve comprises a central section, and side walls constructed with an elongated slit to form a rim and an interior cavity and an external shell. The elongated sleeve is composed of a flexible material and additionally comprises a stabilizing means integrally associated therewith. The stabilizing means is provided to mitigate movement of the elongated sleeve along the seat. Next, the method provides for aligning the portion of the seat with the elongated slit and the rim of the elongated sleeve and inserting the portion of the seat within the interior cavity of the elongated sleeve. After aligning the seat and sleeve and inserting the seat into the sleeve, the next step involves securing the stabilizing means on a back section of the portion of the seat. Then the central section of the elongated sleeve is slid over the portion of the seat to temporarily house the seat within the elongated sleeve. The portion of the seat is completely and temporarily housed within the elongated sleeve. The elongated sleeve of the seat covering is then used for a single period of time, after which the elongated sleeve is removed from the seat by pulling upward on the sleeve. The elongated sleeve is then discarded.

BRIEF DESCRIPTION OF THE DRAWING

The invention will be more fully understood and further advantages will become apparent when reference is had to the following detailed description of the preferred embodiments of the invention and the accompanying drawings, in which:

FIG. 1b illustrates a front view of the embodiment of the disposable sanitary cover for temporarily housing a portion of a seat and mitigating virus and germ contact on a person's body shown in FIG. 1a;

FIG. 2b illustrates a side cross-sectional view taken along line X in FIG. 2a;

DETAILED DESCRIPTION OF THE INVENTION

The present invention provides a disposable sanitary cover for temporarily housing a seat utilized by the public to prevent the spread of germs from the seat surface to a person's body. Moreover, the sanitary covering may be utilized to cover a high chair or baby chair while an infant is eating to protect the seat and ease clean-up, and prevent the spread of germs when an infant is utilizing a restaurant's highchair. The present invention also provides a method for using the sanitary cover. Broadly, the disposable sanitary cover comprises an elongated sleeve with an elongated slit therein, and a stabilizing means. Advantageously, the disposable sanitary cover is readily and effortlessly slipped over a public seat, such as a movie theater seat, train seat, airplane seat, or highchair. Upon getting up from the seat, the disposable sanitary cover is readily removed and discarded. A stabilizing means is provided to mitigate movement of the disposable cover while on the seat. Prevention of movement or shifting along the seat body protects the user's body from contacting unnecessarily exposed areas of the seat and thwarts damage to the cover during use.

Figure 1A:
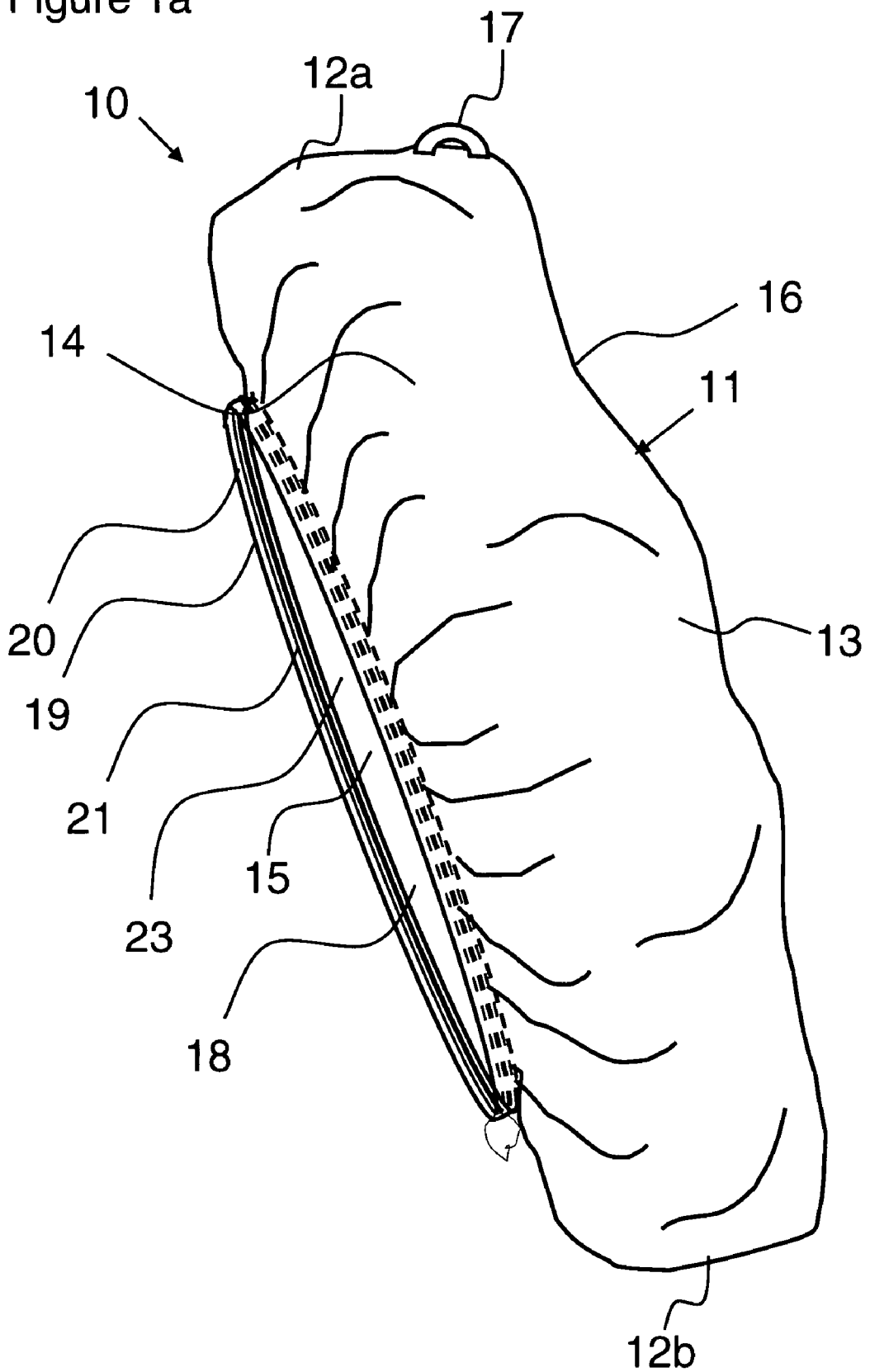
FIG. 1a illustrates a side view of an embodiment of the disposable sanitary cover for temporarily housing a portion of a seat and mitigating virus and germ contact on a person's body, wherein the stabilizing means comprises an elastic band located on the rim of the elongated sleeve.
Figure 1C:
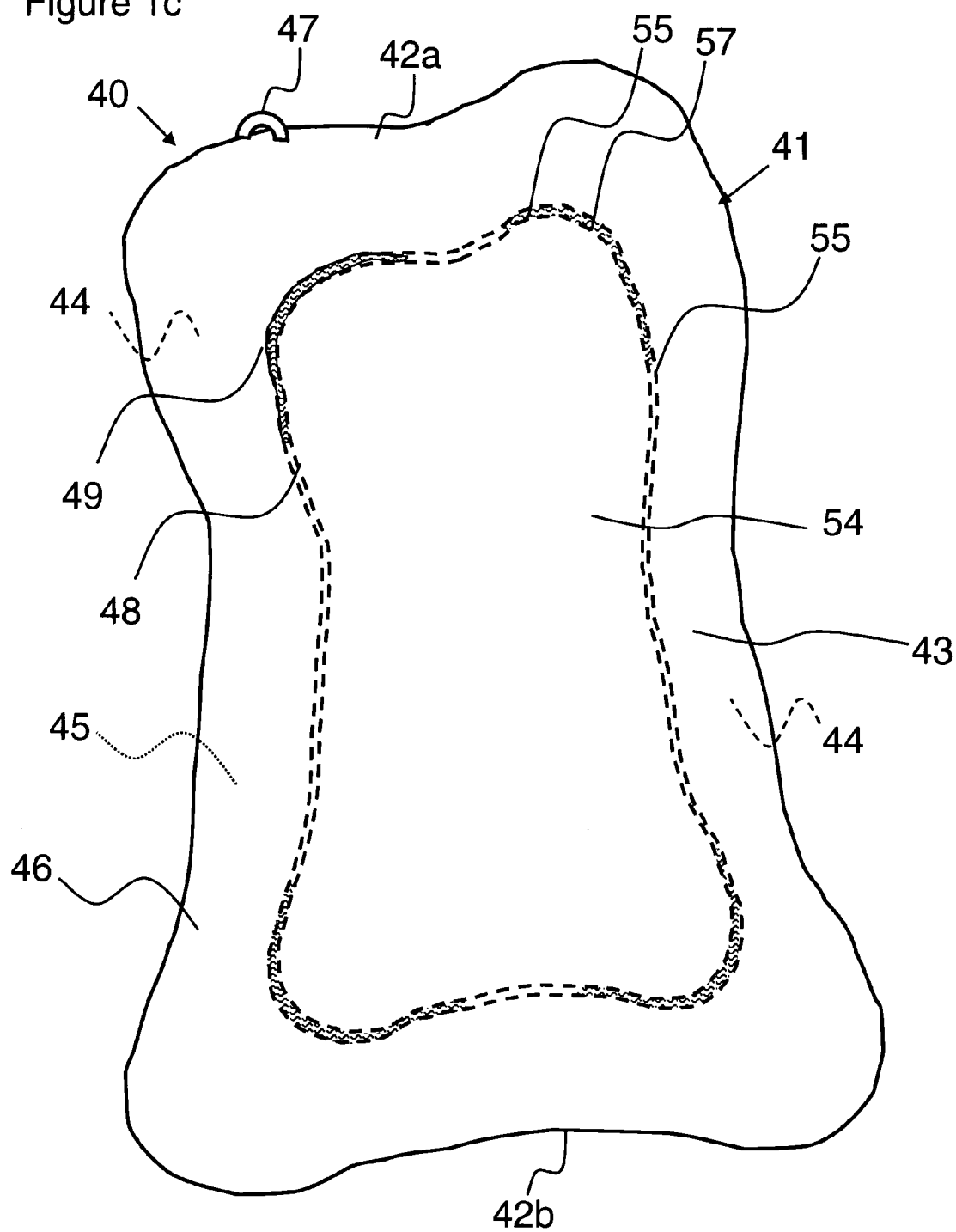
FIG. 1c illustrates a front view of the embodiment of the disposable sanitary cover for temporarily housing a seat as in FIG. 1a, except wherein the stabilizing means comprise elastic segments spatially located on the rim of the elongated sleeve.

FIGS. 1a, 1b and 1c illustrate views of an embodiment of the disposable sanitary cover for temporarily housing a portion of a seat wherein the stabilizing means comprises an elastic band located on the rim of the elongated sleeve. Particularly, FIG. 1a illustrates a side view shown generally at 10, FIG. 1b illustrates a front view shown generally at 30 wherein the stabilization means is in the form of an elastic band circumferentially located around the rim of the sleeve, and FIG. 1c illustrates a front view shown generally at 40 of the embodiment of the disposable sanitary cover for temporarily housing a seat as in FIG. 1a, except that the stabilizing means comprises elastic segments spatially located on the rim of the elongated sleeve.

Disposable sanitary cover 10, 30, 40 is appointed to be received on a portion of a seat, including public seating such as movie theater seats, train, bus, airplane, or infant seats in restaurants. In this embodiment, the disposable sanitary cover 10, 30 includes an elongated sleeve 11, 41 having first 12a, 42a and second ends 12b, 42b a central portion 13, 43 and side walls 14, 44 constructed to form an interior cavity 15, 45 and an external shell 16, 46. Elongated sleeve 11, 41 is composed of a flexible material, and is preferably composed of a paper material or paper netting. Alternatively, elongated sleeve 11, 41 is composed of an absorbent paper material on external shell 16, 46 and an inner polymeric liner located within interior cavity 15, 45 for mitigating the risk of leakage of liquid onto the seat. If elongated sleeve 11, 41 is composed of a polymeric material, such as a thin plastic material, it should be recyclable in nature. Most preferably, elongated sleeve 11, 41 is composed of a biodegradable fiber, so that disposable sanitary cover 10, 30, 40 is lightweight, easy to use, and environmentally friendly. Preferably, disposable sanitary cover 10, 30, 40 shall be appointed to be dispensed in an interior entry way of a movie theater, restaurant, air port, or other terminal. Alternatively, disposable sanitary cover 10, 30, 40 may be provided in a sealed packaging appointed to house disposable sanitary cover 10, 30, 40 prior to use in a clean environment. External shell 16, 46 of elongated sleeve 11, 41 may include indicia thereon, such as a design logo of a store, advertising indicia by any large company, or the like. Disposable sanitary cover 10, 30, 40 is preferably disposed of after a single usage.

A tab member 17, 47 may be integrated within elongated sleeve 11, 41 so that disposable sanitary cover 10, 30, 40 can be removed from the seat with minimal effort. Tab member 17, 47 is simply pulled upward upon so that the disposable sanitary cover 10, 30, 40 is removed from the seat. If not for this tab member 17, 47, the user may have to grasp a portion of the seat, likely an exposed area, with one hand and grasp the disposable sanitary cover 10, 30, 40 with the other and pull upward to effect the removal thereof. Unfortunately, such removal will cause contact of the user's hand with that portion of the seat, negating the intended purpose of the cover 10, 30, 40, to prevent germ contact. Tab member 17, 47 provides the ability to remove the cover 10, 30, 40 without exposing the user to the germs on the seat. This situation may arise wherein the cover 10, 30, 40 snuggly fits over the seat; however, where the cover 10, 30, 40 is loosely fit onto the seat/chair, the user can simply grab any gaping portion of the cover 10, 30, 40 to effectuate removal in a sanitary manner.

Elongated sleeve 11, 41 further comprises an elongated slit 18, 48 forming a rim 19, 49 traversing along side walls 14, 44 for accessing interior cavity 15, 45 within elongated sleeve 11, 41. Slit 18, 48 extends from each of the first and second ends 12a, 42a and 12b, 42b of elongated sleeve 11, 41 forming a rim 19, 49 within elongated sleeve 11, 41 and yielding a rear opening 23, 54. A portion of the seat is appointed to be inserted into and received through elongated slit 18, 48 so that the seat is housed within the interior cavity 15, 45 of elongated sleeve 11, 41 so that the passage of germs from the seat to a person's body is mitigated.

Disposable sanitary cover 10, 30, 40 further comprises a stabilizing means 20, 55 integrally constructed therein so as to diminish movement of elongated sleeve 11, 41 lengthwise and horizontally on the seat. Stabilizing means 20, 55 is integrally constructed within elongated sleeve 11, 41 and is associated with rim 19, 49 for securing elongated sleeve 11, 41 to the seat and mitigating movement of elongated sleeve 11, 41 when disposable sanitary cover 10, 30, 40 is being used. Movement of disposable sanitary cover 10, 30, 40 back and forth on the seat yields both unwanted exposure of portions of the seat while at the same time tends to cause damage to the cover. Stabilization means 20, 55 is further provided to facilitate placement of the cover 10, 30, 40 on the seat, as well as to provide securement thereto. In the embodiment of FIG. 1b, stabilization means 20 comprises an elastic band 21 circumferentially located along rim 19 of elongated sleeve 11 so that elastic band 21 tightly embraces the back of the portion of the seat and central portion 13 covers the area of the seat appointed to be sat on or come into contact with a person's backside. In FIG. 1c stabilization means 55 comprises elastic segments 57 located on rim 43.

In this manner, elastic band 21 tightly grasps the back or rear of the seat in order to mitigate or prevent shifting of cylindrical sleeve 11 and secure same to the seat. Elastic band 21 may be coated with a frictional layer so that the band 21 does not travel on the back of the seat. Alternatively, stabilizing means 55 may be provided as elastic segments 57, as is shown in FIG. 1c. Prevention of the elongated sleeve 11 from moving to and from while covering the seat is advantageous in that it mitigates unwanted exposure of the user's body to seat areas that are sought to be covered. That is to say, that without the ability to prevent substantial movement of elongated sleeve 11, the sleeve 11 would readily shift off from or slide off from the seat as the user or person shifts around or stands up and sits down. Although elongated sleeve 11 is shown as a rectangular shape, elongated sleeve 11 may have a plethora of shapes, including an elongated oval shape.

Figure 2A:
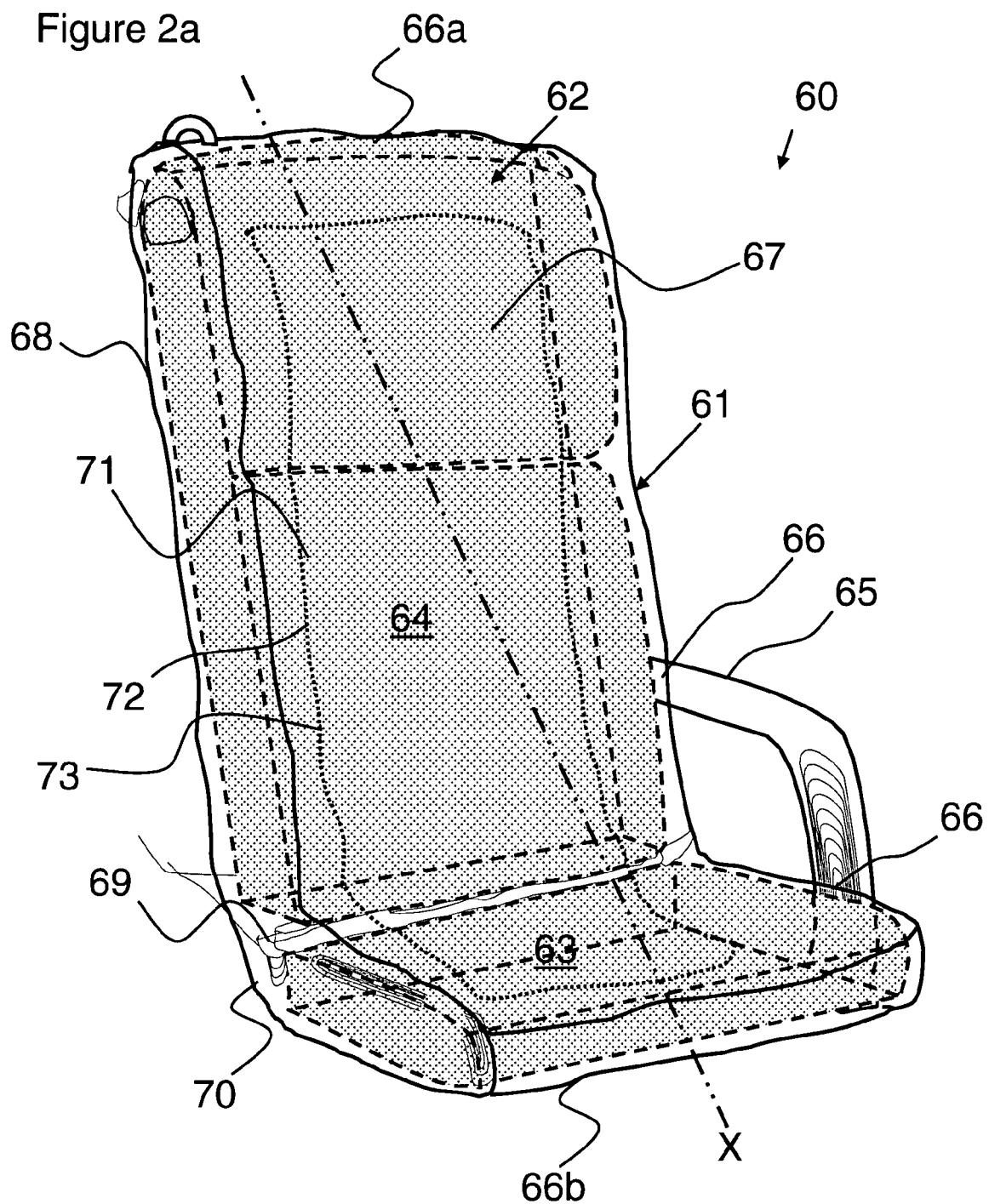
FIG. 2a illustrates a front view of the disposable sanitary cover shown in the embodiment of FIG. 1a temporarily covering and housing a portion of a movie theater seat therein.
Figure 2B:
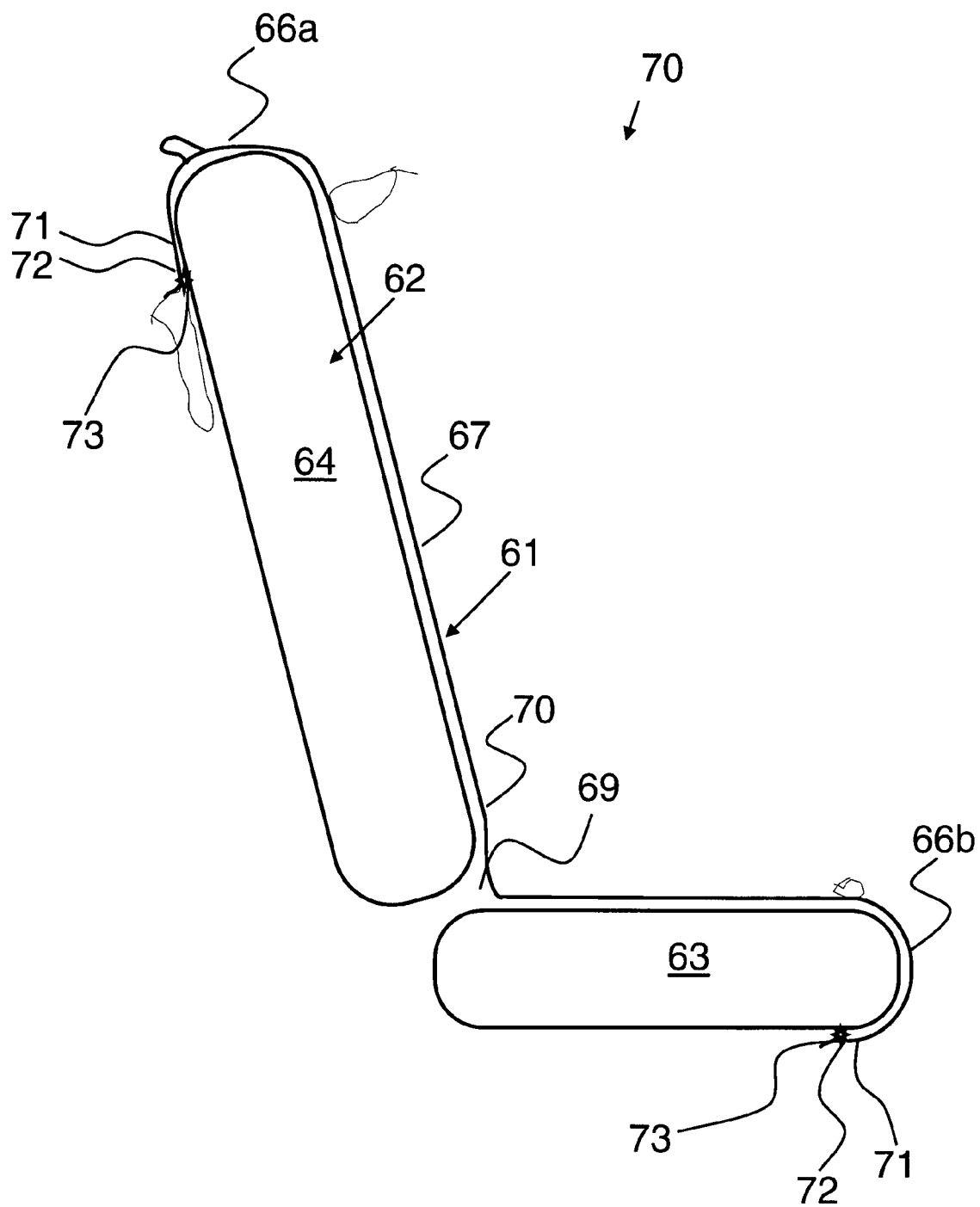

FIGS. 2a and 2b illustrate views of the disposable sanitary cover shown in the embodiment of FIG. 1a, showing the cover temporarily housing a portion of a movie theater seat therein. FIG. 2a illustrates a front view of the disposable sanitary cover housing a movie theater seat therein at 60, while FIG. 2b illustrates a side cross-sectional view taken along line X in FIG. 2a at 80. As shown here, the disposable sanitary cover 60, 80 is provided as an elongated sleeve 61 covering a base/seat section 63 and back support section 64 of a seat/chair 62. Herein seat 62 has an arm 65 that is detached from base section 63 and back support section 64 so that there is a gap 66 therebetween for accommodating disposable sanitary cover 60, 80. Alternatively, disposable sanitary cover 60, 70 may simply be stretched over arm 65 as well as it is basically constructed as a net or shell covering. Elongated sleeve 61 has first 66a and second ends 66b, a central portion 67, and side walls 68 constructed to form an interior cavity 69 and an external shell 70. Elongated sleeve 11 further comprises an elongated slit 71 forming a rim 72 traversing along side walls 68 for accessing interior cavity 69 within elongated sleeve 61. First end 66a of elongated sleeve 61 is stretched so that rim 72 with stabilization means 73 extends over the rear of back support section 64 of seat 62. Elongated sleeve 61 is then pulled downward so that central portion 67 extends over back support section 64 and base section 63 and side walls 68 cover the sides of back support section 64 and base section 63. Second end 66b is then stretched over the end of base section 63 of seat 62 so that rim 72 and stabilizing means 73 engage with the rear of base section 63.

Figure 3:
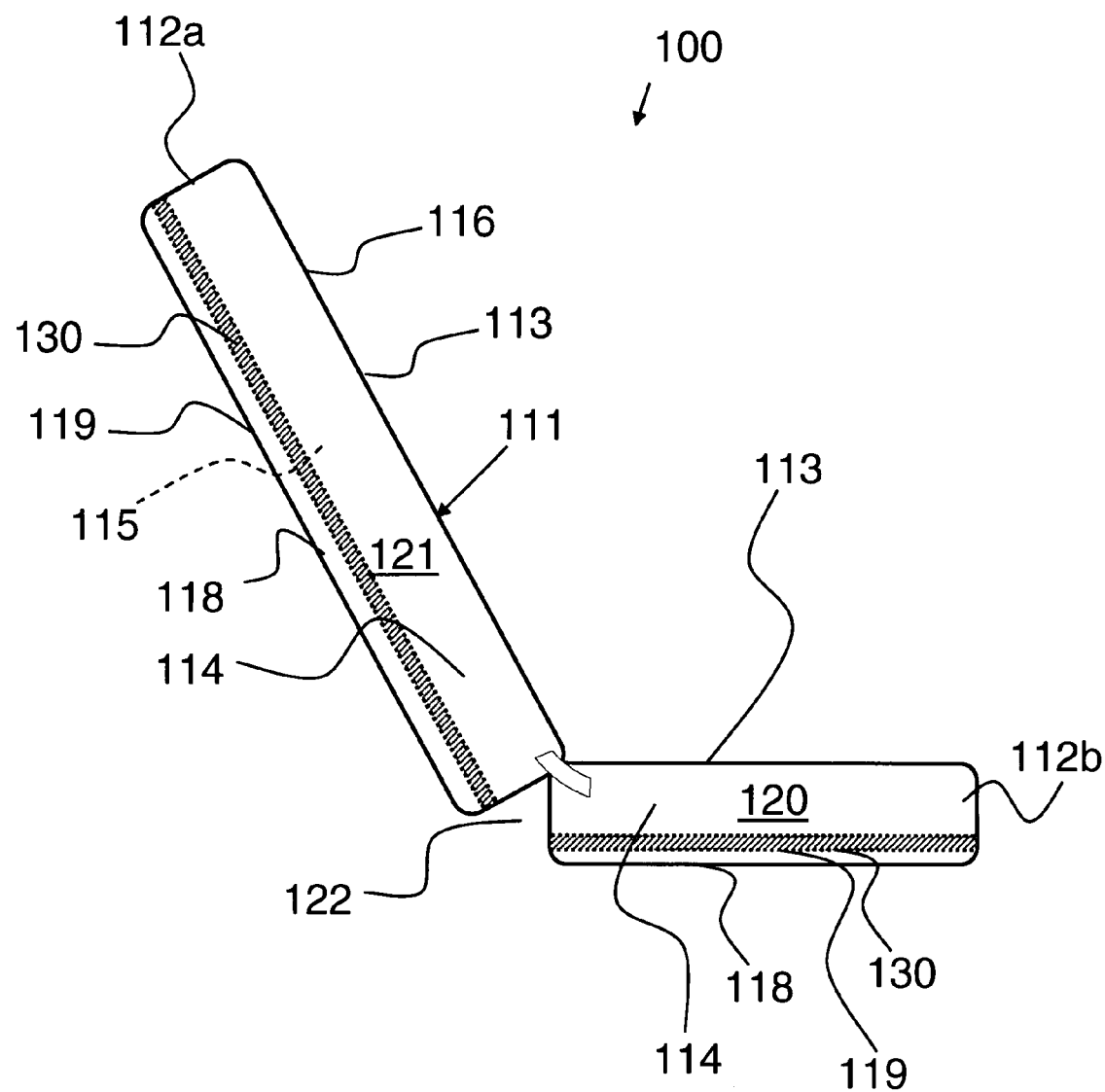
FIG. 3 illustrates a side view of another embodiment of the disposable sanitary cover, wherein the elongated sleeve includes a seat segment and a back segment divided by a lateral slit.

The disposable sanitary cover may be divided as with a seat segment and a back segment separated by a lateral slit, as is shown in FIG. 3 at 100. In this embodiment, the disposable sanitary cover 100 includes an elongated sleeve 111 having first 112a and second ends 112b, a central portion 113, and side walls 114 constructed to form an interior cavity 115 and an external shell 116. Disposable sanitary cover 100 further comprises a stabilizing means 130 integrally constructed therein so as to diminish movement of elongated sleeve 111. Stabilizing means 130 is integrally constructed within elongated sleeve 111 and is associated with rim 119 for securing elongated sleeve 111 to the seat and mitigating movement of elongated sleeve 111 when disposable sanitary cover 100 is being used. Elongated sleeve 111 further comprises an elongated slit 118 forming rim 119 traversing along side walls 114 for accessing interior cavity 115 within elongated sleeve 111. Slit 118 extends from each of the first and second ends 112a and 112b of elongated sleeve 111 forming a rim 119 within elongated sleeve 111. Herein the elongated sleeve 111 further includes a seat segment 120 and a back segment 121 divided by a lateral slit 122. Back segment 121 is provided to slide over a back support section of a chair, while seat segment 120 is provided to slide over a seat section of the chair and lateral slit 122 provides gap to accommodate the flexing between the sections of the chair.

Figure 4:
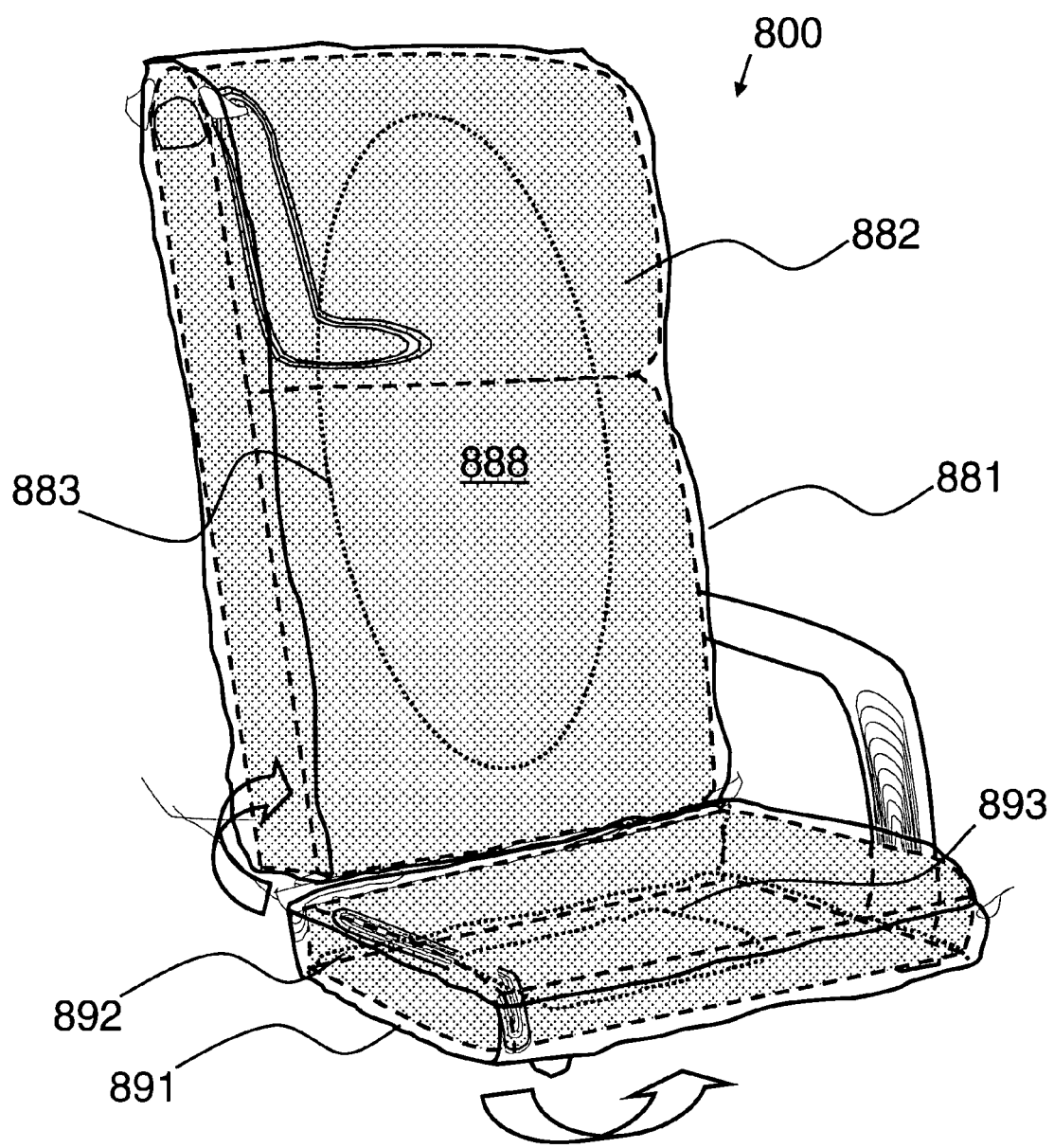
FIG. 4 illustrates a front view of another embodiment of the disposable sanitary cover applied on a seat, wherein a disposable sanitary cover is separately placed on a base section and a back support section of a seat.

In an alternative embodiment, a covering may be provided for each seat section, the base section and the back support section, as is shown in FIG. 4, generally at 800. According to this embodiment, a first elongated sleeve 881 is provided for back support section 882 of chair 888, while a second elongated sleeve 891 is provided for base section 892 of chair 888. First elongated sleeve 881 includes stabilizing means 883; second elongated sleeve 891 includes stabilizing means 893 (preferably in the form of the elastic band).

Figure 5:
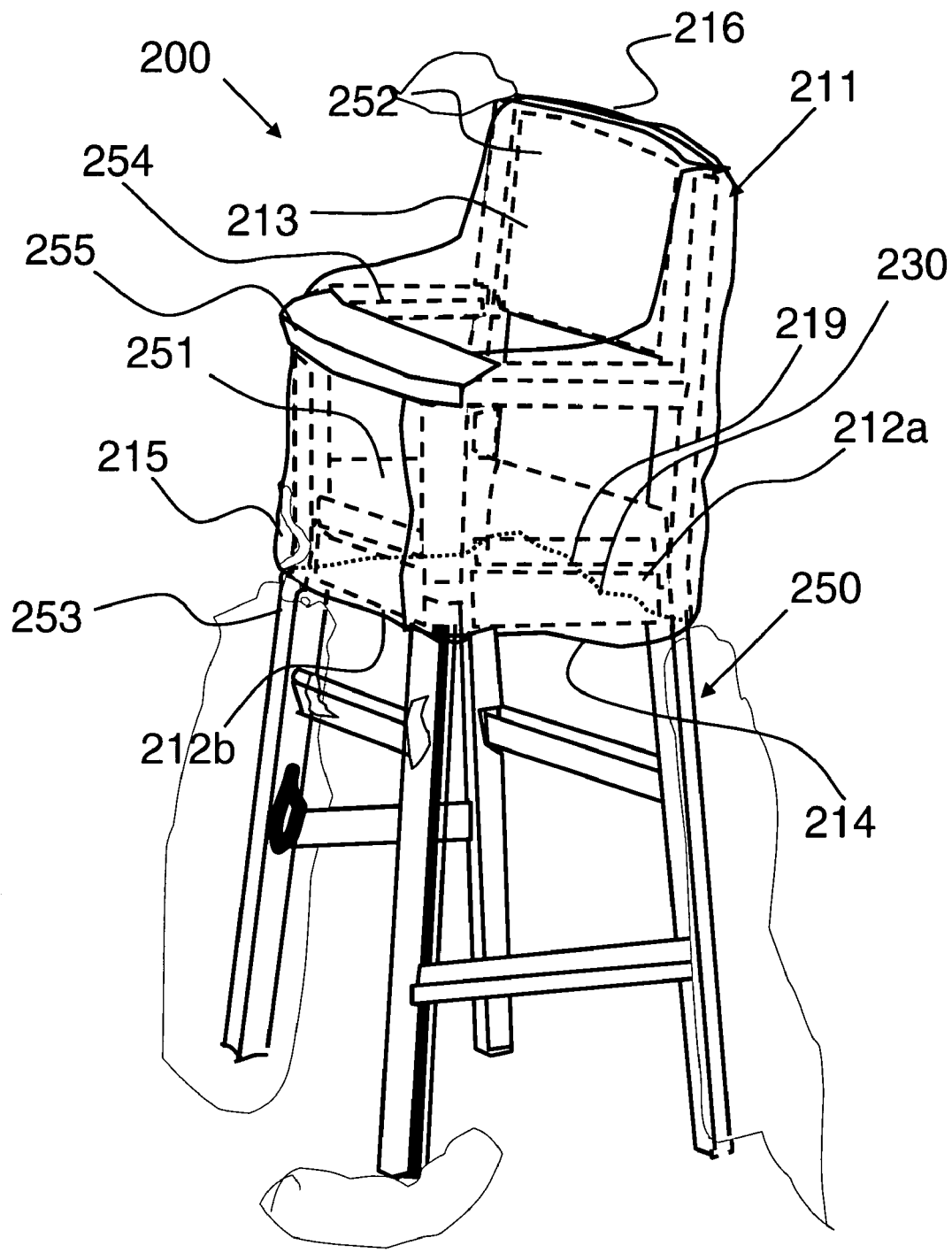
FIG. 5 illustrates a view of an embodiment wherein the disposable sanitary cover is constructed as in FIGS. 1a and 1b, but is smaller in size and is appointed for placement on a highchair or child's chair.

FIG. 5 illustrates a view of an embodiment wherein the disposable sanitary cover is constructed as in FIGS. 1a and 1b, but is smaller in size and is appointed for placement on a highchair or child's chair to protect the chair from food and liquid, and to further protect the child from contaminant on the chair if/when the chair is in a public restaurant, shown generally at 200. Disposable sanitary cover 200 is placed on a highchair 250 or booster seat, or the like. In this embodiment, the disposable sanitary cover 200 includes an elongated sleeve 211 having first and second ends 212a and 212b, a central portion 213, and side walls 214 constructed to form an interior cavity 215 and an external shell 216. Elongated sleeve 211 is composed of a flexible material, and is preferably composed of a paper material or paper netting. More preferably, elongated sleeve 211 is composed of an absorbent paper material on external shell 216 and an inner polymeric liner located within interior cavity 215 for mitigating leakage of liquid onto the highchair 250. Elongated sleeve 211 includes an elongated slit forming a rim 219 traversing along side walls 214 for accessing interior cavity 215 within elongated sleeve 211. A portion of the chair 250 is appointed to be inserted into and received through elongated slit and rim 219 so that the seat area 251 and back support area 252 of chair 250 is housed within interior cavity 215 of elongated sleeve 211 so that the passage of germs from the chair 250 to the child is mitigated. At the same time, food and liquid spillage onto the chair 250 is alleviated.

Disposable sanitary cover 200 further comprises a stabilizing means 230 integrally constructed therein so as to diminish movement of elongated sleeve 211 lengthwise and horizontally on the seat. Stabilizing means 230 is integrally constructed within elongated sleeve 211 and is associated with rim 219 for securing elongated sleeve 211 to the chair 250 and mitigating movement of elongated sleeve 211 when disposable sanitary cover 200 is being used. Preferably, stabilizing means 230 is an elastic band that circumferentially surrounds rim 219. In operation, elongated sleeve 211 is stretched over back support area 252 of chair 250 so that rim 219 and stabilizing means 230 engages with the rear of the back support area 252. Elongated sleeve 211 is then pulled downward so that central portion 213 covers seat area 251 and even extends over arms 254 of chair 250. Rim 219 and stabilizing means 230 then come to rest on legs 253 of chair 250. Side walls 214 traverse the sides of back support area 252 and seat area 251 while rim 219 and stabilizing means 230 engage with the rear of back support area 252 and seat area 251. As the child is placed in the chair 250 with cover 200 thereon, the cover 200 deforms and is compressed onto the chair 250. A food tray 255 associated with chair 250 may then be slid onto arms 254 as usual as cover 200 is so thin that it does not obstruct the track associated with the food tray 255 and arms 254 (even so, the paper may rip in that section of the cover 200 without causing damage to the overall integrity of the cover 200). As the child eats in the chair 250, food particles and liquid fall onto the cover 200 and food tray (if one is applied). When the child has finished eating, the child is removed from the chair 250 and the soiled cover 200 is slipped-off and discarded to reveal a clean chair 250.

Having thus described the invention in rather full detail, it will be understood that such detail need not be strictly adhered to, but that additional changes and modifications may suggest themselves to one skilled in the art. For example, the disposable sanitary cover may be provided in a size and shape to accommodate a bench seat, such as on a bus or train, or a captain type seat such as in a movie theater or on an airplane. Such modifications are intended to fall within the scope of the invention, as defined by the subjoined claims.

What is claimed is:

1. A disposable sanitary cover for temporarily housing a seat and mitigating virus and germ contact on a person's body, comprising:
   a. an elongated sleeve having a first end, a second end, a central section, side walls constructed to form an interior cavity and an external shell, and being composed of a biodegradable fiber, said external shell being continuous without any apertures, openings or holes;
   b. said elongated sleeve further comprising an elongated slit forming a rim traversing along said side walls appointed for accessing said interior cavity within said elongated sleeve, said rim being appointed to grasp a backside of said seat;
   c. stabilizing means integrally constructed within each of said first end, second end, central section, and side walls of said elongated sleeve and being integrated within a substantial portion of said rim for securing said elongated sleeve to said portion of said seat and mitigating movement of said elongated sleeve when said disposable sanitary cover is being used;
   d. said first end, second end and side walls of said elongated sleeve extend from said central section and are appointed to substantially extend onto and grasp said backside of said seat;
   e. said first end being appointed to extend over and cover a back support section of said seat to form a back segment and said second end being appointed to cover a base/seat section of said seat to form a seat segment;
   f. said seat segment and back segment being divided by a lateral slit;
   wherein said base/seat section and back support section of said seat are received through said elongated slit and is housed within said interior cavity of said elongated sleeve in order to mitigate said virus and germ contact between said base/seat section and back support section of said seat and said person's body.

2. A disposable sanitary cover as recited by claim 1 comprising a tab member for removing said disposable seat cover from said portion of said seat.

3. A disposable sanitary cover as recited by claim 1, wherein said stabilizing means comprises an elastic band circumferentially located on said rim.

4. A disposable sanitary cover as recited by claim 3, wherein said elastic band located within said rim further comprises a coating with a frictional layer.

5. A disposable sanitary cover as recited by claim 1, wherein said stabilizing means comprises elastic segments spatially located on said rim.

6. A disposable sanitary cover as recited by claim 1 comprising a disposable packaging appointed to house said disposable sanitary cover prior to use.

7. A disposable sanitary cover as recited by claim 1, wherein said elongated sleeve has a rectangular shape.

8. A disposable sanitary cover as recited by claim 1, wherein said elongated sleeve has an elongated oval shape.

9. A disposable sanitary cover as recited by claim 1, wherein said portion of said seat includes a base section and a back support section, and wherein at least one elongated sleeve is provided for each of said base and back support sections.

10. A disposable sanitary cover as recited by claim 1, wherein said elongated sleeve further comprises at least one arm rest covering portion appointed for covering an arm of said seat.

11. A disposable sanitary cover as recited by claim 1, wherein said elongated sleeve is composed of a paper material.

12. A disposable sanitary cover as recited by claim 1, wherein said elongated sleeve is composed of an absorbent paper material on said external shell and an inner polymeric liner located within said interior cavity for mitigating leakage of liquid onto said seat.

13. A disposable sanitary cover as recited by claim 1, wherein said external shell of said elongated sleeve includes indicia thereon.

14. A disposable sanitary cover as recited by claim 1, wherein said seat is a movie theater seat.

15. A disposable sanitary cover as recited by claim 1, wherein said seat is utilized in mass public transportation.

16. A method of using a disposable sanitary cover for temporarily housing a seat and mitigating virus and germ contact on a person's body, comprising the steps of:
 a. removing an elongated sleeve from a dispensing device, said elongated sleeve comprising a first end, second end, a central section, and side walls constructed with an elongated slit to form a rim and an interior cavity and an external shell, said elongated sleeve being composed of a biodegradable paper fiber, said external shell being continuous without any apertures, openings or holes and said rim being appointed to grasp a backside (back or rear) of said seat, said elongated sleeve further comprising stabilizing means integrally associated therewith, wherein said stabilizing means mitigates movement of said elongated sleeve along said portion of said seat, wherein said first end, second end and side walls of said elongated sleeve extend from said central section and are appointed to substantially extend onto and grasp said backside of said seat, and wherein said elongated sleeve constructed to cover a base/seat section and back support section of said seat to form a back segment and a seat segment divided by a lateral slit;
 b. aligning said portion of said seat with said elongated slit and said rim of said elongated sleeve;
 c. inserting said portion of said seat within said interior cavity of said elongated sleeve;
 d. securing said stabilizing means on a back section of said portion of said seat; and
 e. sliding said central section of said elongated sleeve over said portion of said seat so that said portion of said seat is temporarily housed within said elongated sleeve;
 f. sitting on said seat and visa vie said elongated sleeve for a period of time, after which said elongated sleeve is scheduled to be removed from said seat;
 g. removing said cylindrical sleeve from said seat by way of pulling on said elongated sleeve; and
 h. discarding said elongated sleeve,
 wherein said base/seat section and back support section of said seat are received through said elongated slit and is housed within said interior cavity of said elongated sleeve in order to mitigate said virus and germ contact between said base/seat section and back support section of said seat and said person's body.

17. A method of using a disposable sanitary cover as recited by claim 1, wherein said dispensing device is located in a movie theater and said seat appointed to receive said sanitary cover is a movie theater seat.

18. A method of using a disposable sanitary cover as recited by claim 1, wherein said dispensing device is located in a terminal associated with mass transportation and said seat appointed to receive said sanitary cover is utilized in mass public transportation.

* * * * *